(12) United States Patent
Nellutla et al.

(10) Patent No.: US 12,062,201 B2
(45) Date of Patent: Aug. 13, 2024

(54) GENERATING SYMMETRICAL REPEAT EDITS FOR IMAGES

(71) Applicant: Adobe Inc., San Jose, CA (US)

(72) Inventors: Aditya Nellutla, Bangalore (IN); Harish Kumar, Noida (IN)

(73) Assignee: Adobe Inc., San Jose, CA (US)

( * ) Notice: Subject to any disclaimer, the term of this patent is extended or adjusted under 35 U.S.C. 154(b) by 74 days.

(21) Appl. No.: 17/896,798

(22) Filed: Aug. 26, 2022

(65) Prior Publication Data

US 2024/0070891 A1    Feb. 29, 2024

(51) Int. Cl.
| | |
|---|---|
| G06T 7/68 | (2017.01) |
| G06T 3/02 | (2024.01) |
| G06T 3/60 | (2024.01) |
| G06T 7/11 | (2017.01) |
| G06T 11/00 | (2006.01) |
| G06V 10/20 | (2022.01) |

(52) U.S. Cl.
CPC ............... *G06T 7/68* (2017.01); *G06T 3/02* (2024.01); *G06T 3/60* (2013.01); *G06T 7/11* (2017.01); *G06T 11/00* (2013.01); *G06V 10/255* (2022.01)

(58) Field of Classification Search
None
See application file for complete search history.

(56) References Cited

U.S. PATENT DOCUMENTS

| | | |
|---|---|---|
| 10,402,954 B2 | 9/2019 | Biswas |
| 10,748,316 B2 | 8/2020 | Phogat et al. |
| 10,783,396 B2 | 9/2020 | Biswas et al. |
| 2017/0024607 A1* | 1/2017 | Kons ................. G06V 40/171 |
| 2022/0108542 A1* | 4/2022 | Zhang ................ G06V 10/803 |
| 2022/0114746 A1* | 4/2022 | Li .......................... G06T 17/00 |
| 2023/0186591 A1* | 6/2023 | Sakai .................. G06V 10/44 |
| | | 382/190 |

* cited by examiner

*Primary Examiner* — Michael J Cobb
(74) *Attorney, Agent, or Firm* — Nicholson De Vos Webster & Elliott LLP (57) ABSTRACT

Embodiments are disclosed for identifying and generating symmetrical repeat edits to similar objects in an image. A selection of a first object and an edit to the first object in an image is received. The image is searched for a plurality of candidate objects that have a similar shape to the first object and the plurality of candidate objects are filtered to include one or more objects that are symmetrical with the first object. A symmetric object is selected from the plurality of candidate objects. An axis of symmetry is computed between the symmetric object and the first object. The edit is applied to the symmetric object and to the first object.

20 Claims, 8 Drawing Sheets

GENERATING SYMMETRICAL REPEAT EDITS FOR IMAGES

BACKGROUND

In graphic design applications, symmetric shapes are commonly used to produce artistic designs, illustrations, or other visual graphics. Symmetry is a relationship between shapes where one shape becomes an exact match to another shape by applying a rotation or translation. Within a single graphic design, multiple symmetric relationships can exist. For example, a face of a person may have multiple symmetric objects such as ears, eyebrows, eyes, or jewelry.

The use of symmetric shapes is common in artistic design, illustration, and graphical editing, both for vector and raster graphics designs. One existing technique requires a user to explicitly define objects as symmetric when each object is created. However, only objects that have a defined relationship at creation can be edited. As such, this solution is not scalable or adaptable to existing graphics designs or designs in progress after an object has been created without an explicit link to another object.

SUMMARY

Introduced here are techniques/technologies that relate to identifying and generating symmetrical edit repeats to similar objects in an image. The system receives a selection of a first object in an image and identifies similar objects within the image. Similar objects are identified based on a comparison of the shape of the first object and each similar object. From the similar objects, one of the similar objects is selected by a filter as having symmetry with the first object. To determine symmetry, the similar shapes are analyzed to determine a relationship between the similar shape and the first object (e.g., translation, rotation, or scaling). The similar objects are filtered to identify symmetry by measuring a rotation angle between each similar object and the first object. The similar object that has symmetry with the first object can be linked to the first object to form a symmetric object pair. The symmetric pair may be used for subsequent processing, such as to perform edit repeats on the symmetric object based on the edits to the first object. For instance, changing an appearance attribute such as color of the first object will change color across the symmetric pair of shapes including the first object and the symmetric object.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

One or more embodiments of the present disclosure include a vector graphics system including a symmetric editor that generates an output symmetric object pair and performs symmetric editing of the object pair. Increasing use of symmetrical shapes in graphic designs causes graphic designers to lose productivity. Additionally, applying precise edits to multiple symmetric shapes is time consuming and requires an extensive level of expertise which is not possessed by an average graphic designer. Existing approaches include generating repeats of an existing shape, such as by creating a manual link between shapes during an initial design process for each object that is intended to have a symmetric object. However, this approach is limited to objects created during the design process and does not include detecting objects that have existing symmetry (e.g., from an image) or become symmetric independently of each other (e.g., two different objects that become symmetric during independent designs).

Conventional techniques lack the ability to accurately detect objects that have existing symmetry (e.g., from an image) or become symmetric independently of each other (e.g., two different objects that become symmetric during independent designs). As a result, conventional systems are not able to apply repeats or symmetric edits on objects that do not have an explicitly formed symmetric relationship (e.g., creating a second object using a repeat). To address these and other deficiencies in conventional systems, embodiments identify a pair of objects that are symmetric within an image. After identifying a pair of objects that have symmetry, an edit can be performed to both objects in the symmetric pair.

Embodiments identify and generate symmetrical repeat edits to similar objects in an image. Similar objects are identified by comparing a size and shape of existing objects in an image to an object selected by a user. Not all similar objects are necessarily symmetric, as such the similar objects are filtered to remove any non-symmetric similar objects. Symmetry can be determined using a rotation angle between each similar object and the object selected by the user. The object selected by the user and one of the similar objects that have symmetry are linked in a symmetric object pair. The linking of the symmetric object pair enables repeat edits using edits to one object in the pair (e.g., the object selected by the user or the symmetric object). Applying the edits to one object in the pair will change an appearance attribute, such as color, of both the object selected by the user and the symmetric object identified by the system.

In an example, if a graphic designer wants to edit symmetrical objects such as a pair of earrings within an image of a face. Using existing techniques, the graphic designer must change both objects separately and executing the exact same change twice requires high precision and expertise in using a graphical design tool set. For example, moving one anchor point by a number of pixels with pen tool and repeating the same manually on other objects with same precision is nontrivial and often error prone. Also, transforming or applying complex shades on symmetrical objects independently is error prone and duplicates efforts from users.

In contrast, embodiments provide the ability to selectively edit pairs of symmetric objects within an image. For example, when edits are made to one object, they are replicated to any other objects determined to be symmetric with the edited object. Embodiments differentiate between symmetric objects and similar objects that lack an axis of symmetry. Continuing with the example of editing the pair of earrings, symmetry is detected between the two earrings that have similar shapes and are symmetric and can have symmetric edits applied, while a necklace of a similar shape in the image but does not have symmetry is excluded from the symmetric edit. By identifying symmetric object pairs from a user selected object, embodiments provide the ability apply more precise edits to pairs of symmetric shapes of the image.

Embodiments provide identification of similar objects and automatically filter using rotational symmetry to select an object that has symmetry with a received object. After the object has been selected, embodiments apply symmetric edits to the selected object and the received object. Typically, a user must apply individual edits to each object separately requiring labor intensive use of a graphical editing tool. By selecting the object that has symmetry with the received object, embodiments provide an automated linkage for editing both objects with a single set of editing inputs and improve the accuracy and efficiency of editing graphical objects.

Figure 1:
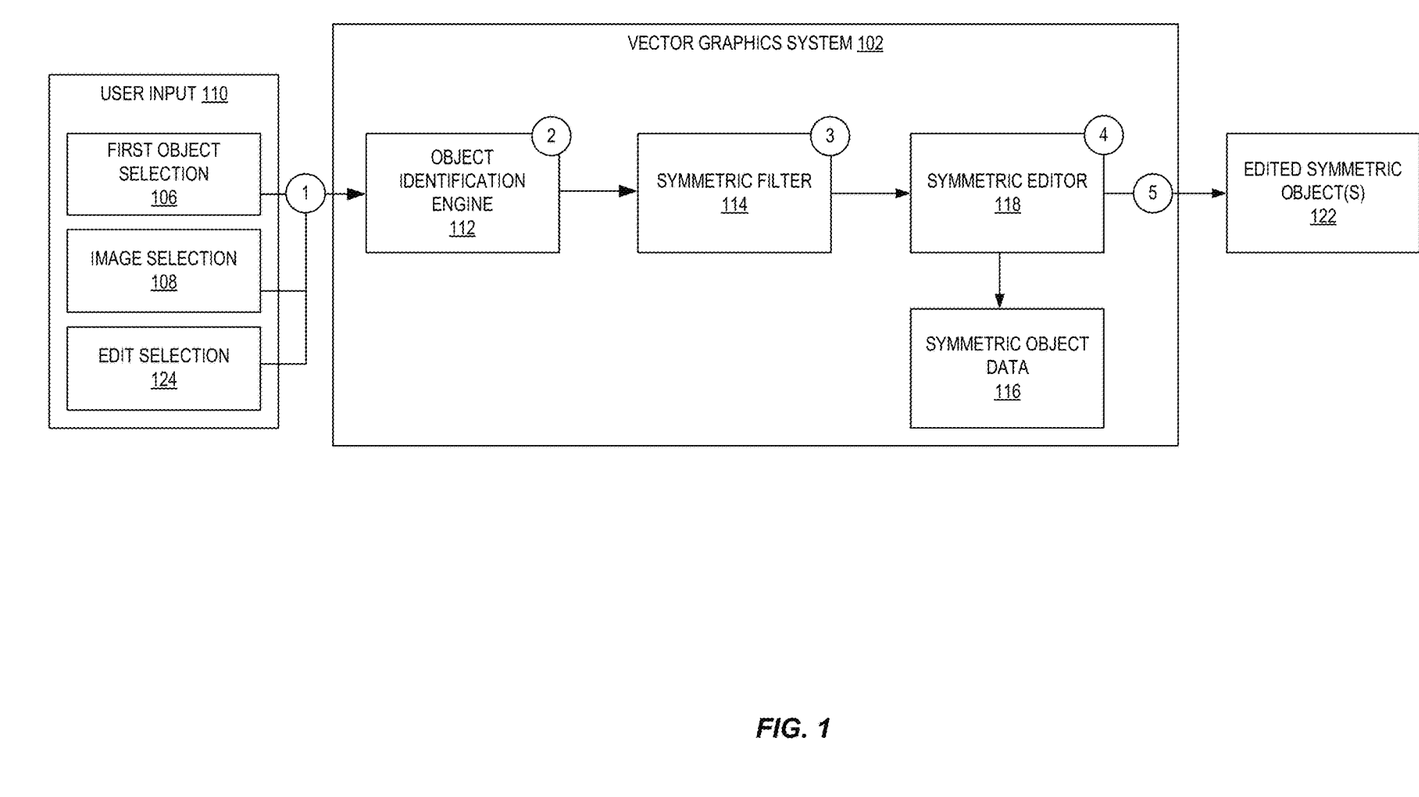
FIG. 1 illustrates a diagram of a process of generating symmetrical repeat edits for images in accordance with one or more embodiments.

FIG. 1 illustrates a diagram of a process of generating symmetrical repeat edits for images in accordance with one or more embodiments. As depicted in FIG. 1, a computing environment 100 includes a vector graphics system 102 that includes an object identification engine 112, a symmetric filter 114, a symmetric editor 118, and symmetric object data 116. symmetric filter 114. In some embodiments, the object identification engine 112, symmetric filter 114, or the symmetric editor 118 are implemented as a module in a vector graphics application 102 or another computing application.

At numeral 1, the object identification engine 112 obtains a first object selection 106, an image selection 108, and an edit selection 124 as part of a user input 110. In an example, the first object selection 106 identifies a vector object in an image (e.g., a vector or raster image file) identified by the image selection 108. The first object selection 106 indicates a first object that is selected for identifying symmetric objects in the image and applying a graphical edit indicated by edit selection 124. The first object is selected by the user from a canvas that is presented in the user interface, such as presented by a client device, and includes the image represented by the image selection 108. In some embodiments, the image corresponding to the image selection 108 may be retrieved by the vector graphics system 102 based on the image selection 108 made through the user interface (e.g., by downloading the image from a remote data store, fetching the image from a local data store, etc.). The edit selection 124 can be selected using the user interface or a tool set of the vector graphics system 102 such as an editing module.

In some embodiments, the vector graphics system receives a user input 110 that includes a region selection (e.g., freeform region, predefined shape region, etc.) within the image selection 108. The region selection can include a portion of the image with one or more objects that form a subset of objects from all of the objects in the image selection 108. The vector graphics system 102 may limit searching and symmetric editing to objects within the region selection that are determined to have symmetry with the first object indicated by the first object selection 106.

The user input 110 includes an edit selection 124 that represents an edit to the first object and a corresponding edit to any object(s) in the image that is determined to have symmetry with the first object. In some embodiments, the edit selection 124 is a request to change a color, shape, or other visual attribute of the first object identified by first object selection 106. In various embodiments, the request includes one or more user inputs received through the user interface. For example, in one such edit selection, the user inputs include selecting (e.g., clicking, tapping, etc.) a point on the object, and moving (e.g., dragging, sliding, etc.) that point from a first location to a second location. Alternatively, for other edit selections, the user inputs include interacting with one or more user interface elements (e.g., buttons, menus, drop down menus, settings panels, etc.) to identify a change in the visual attributes of the object.

At numeral 2, the object identification engine 112 identifies objects in the image that are of similar shape and size to the first object. The object identification engine 112 performs a global search of the image for candidate objects that have a similar shape to the first object. A candidate object is determined to be similar to the selected object when the candidate object can be obtained by applying one or more affine transforms such as translation, scaling, rotation, or reflection to the selected object. An affine transform is a linear mapping that preserves relative positions of points, lines, and places of the selected object (e.g., a line maintains length, end points, etc.) after the transform is applied. The affine transforms can be represented by matrices applied to a set of coordinates for the selected object. Additional details of the object identification engine 112 are described at least with regard to FIG. 2.

At numeral 3, the symmetric filter 114 sorts the candidate objects that were determined to be similar (e.g., at numeral 2) and selects a candidate object that has symmetry with the selected object. In an example with multiple candidate objects that are determined to be similar, the symmetric filter 114 selects the candidate object that has a rotation angle (e.g., relative to the first object) of 0 degrees or 360 degrees and an identical size and shape. The symmetric filter 114 computes a rotation angle using a rotation matrix as described below at least with regard FIG. 3.

In some embodiments, the symmetric filter 114 selects the candidate object that has a minimum distance between the candidate object and the first object. For instance, multiple candidate objects may have symmetry with the first object at different distances from the first object. The symmetric filter 114 computes a distance between each of the candidate objects having symmetry with the first object. The candidate object having symmetry and positioned the shortest linear distance from the first object selection may be selected by the symmetric filter 114. In some embodiments, the symmetric filter 114 can remove the selected object prior to the global search being performed by the object identification engine 112.

At numeral 4, the symmetric editor 118 applies the edit selection 124 to the selected object corresponding to the first object selection 106 and the candidate object that was selected by the symmetric filter 114. The edit selection 124 (e.g., a color change, a shape change, etc.) is applied to each pixel of the candidate object. The application of the edit selection 124 is performed by the symmetric by modifying the color, shape, or other perceptual aspect of the candidate object based on applying the edit selection 124 to the first selected object corresponding to the first object selection. For example, the edit selection 124 is applied to the selected object corresponding to the first object selection 106 and a symmetric transform (e.g., a rotation) is applied prior to applying the edit selection 124 to the candidate object.

At numeral 5, the symmetric editor 118 produces a symmetric object pair 122. For instance, the symmetric editor 118 applies the edit selection 124 symmetrically to each pixel (e.g., symmetric pixels receive the same edit) of the selected object corresponding to the first object selection 106 and the candidate object that was selected by the symmetric filter 114. The edit selection 124 is applied by applying the same transformation to both the selected object corresponding to the first object selection 106 and the candidate object having symmetry. In a simplified example, for symmetric objects that are squares (e.g., first object selection 106 corresponds to a selected object that is a first square, symmetric object is a symmetric square), the edit selection 124 is applied to the top left corner of the first square and to top right corner of the symmetric square because these two locations are symmetric across the axis of symmetry.

The combination of the selected object and the candidate object that was selected by the filter form the symmetric object pair 122. The symmetric object pair 122 is output by the symmetric editor 118 such as to a presentation device or a client device. In some embodiments, the symmetric object pair 122 is output with annotations that identify each object, the axis of symmetry, and other information.

In some embodiments, the symmetric editor 118 operates in a temporal mode that terminates a relationship of the symmetric object pair by removing metadata from the symmetric object pair before outputting the symmetric object pair 122. For example, the vector graphics system 102 may present the user with a selection to temporally associate the selected object to the symmetric object for short-term editing where persistent linkage is not desired.

In some embodiments, the symmetric editor 118 stores a relationship of the symmetric object pair in symmetric object data 116, which may be located in a memory of the vector graphics system 102. For instance, the vector graphics system 102 may present the user with an option to associate the selected object to the symmetric object for long-term editing. The symmetric editor 118 may store an identifier of symmetric object pair 122 in symmetric object data 116 (e.g., metadata or object file data) that links both objects in the symmetric object pair 122 for long-term or subsequent editing.

Subsequently, the symmetric object data 116 is used by the object identification engine 112 when an object is selected. For example, an object identifier associated with the selected object is looked-up in the symmetric object data 116 to determine whether the object has already been stored in symmetric object data 116. For instance, in a first iteration, a user input 110 includes a first object selection 106 that is used to generate a symmetric object pair and is stored in symmetric object data 116. In a subsequent request, the user input 110 includes either the same object as the first object selection 106 or the symmetric object (e.g., the candidate object that was selected by the symmetric filter 114 for adding to the symmetric object pair).

Figure 2:
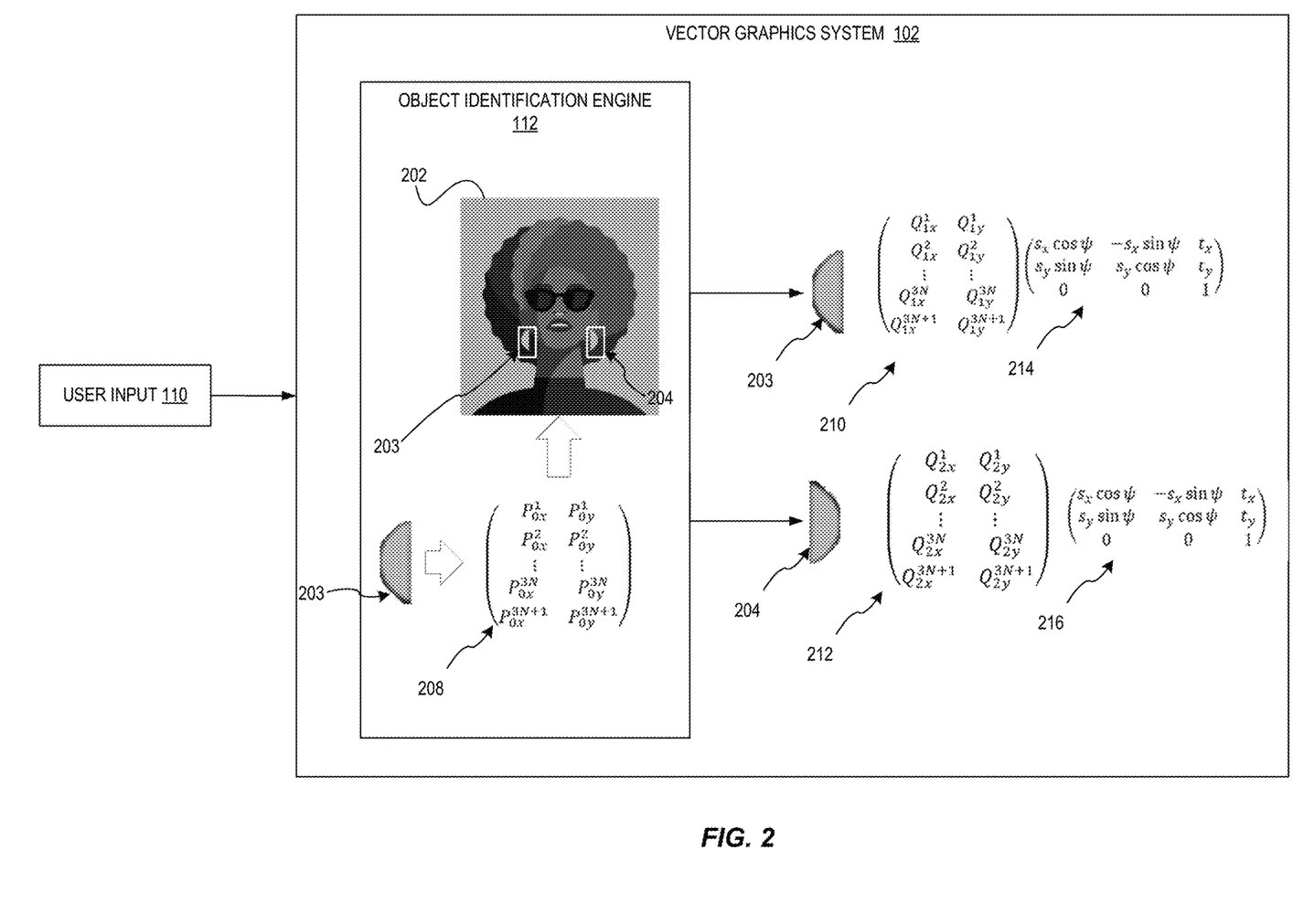
FIG. 2 illustrates an example of determining a similarity between a selected object and multiple objects in an image in accordance with one or more embodiments.

FIG. 2 illustrates an example of determining a similarity between a selected object and multiple objects in an image in accordance with one or more embodiments. As discussed above, the vector graphics system 102 receives a user input 110, including an image selection 108, a first object selection 106, and an edit selection 124. Based on the first object selection 106, the object identification engine 112 performs a global search of the selected image for objects that are similar to the selected object. In some instances, the result is a search that returns a set of similar objects including the object identified by the first object selection and any other objects that are the same shape and size. In the example of FIG. 2, the image selection 108 corresponds to image 202 and the object selection corresponds to object 203. After object 203 is selected, image 202 is searched for similar objects by the object identification engine 112. The search of the image 202 returns the object 203 and the second similar object 204 which has the identical shape and size of the object 203, with a different orientation than the object 203.

To determine similarity, the object identification engine 112 models the shape of the object 203 and identifies a transformation matrix between the shape of the object 203 and one or more similar objects. For example, a series of control points of Bezier segments representing the shape of the object 203 is defined by the object identification engine 112. The series of control points are input into a coordinate matrix 208 which is represented below, where $P_x^i$ and $P_y^i$ are coordinates of control points for each of N Bezier segments forming the shape of object 203.

$$\begin{pmatrix} P_{0x}^1 & P_{0y}^1 \\ P_{0x}^2 & P_{0y}^2 \\ \vdots & \vdots \\ P_{0x}^{3N} & P_{0y}^{3N} \\ P_{0x}^{3N+1} & P_{0y}^{3N+1} \end{pmatrix}$$

Similar shapes are modeled in a similar way by the object identification engine 112, where $Q_x^i$ and $Q_y^i$ are coordinates of control points for each of N Bezier segments of the similar shapes. As illustrated in FIG. 2, for each of the object 203 and the second similar object 204, a corresponding shape is modeled by a coordinate matrix. The object corresponding to the object 203 is represented by coordinate matrix 210 ($Q_{1x}$) and the second similar object 204 is represented by coordinate matrix 212 ($Q_{2x}$).

$$\begin{pmatrix} Q_{1x}^1 & Q_{1y}^1 \\ Q_{1x}^2 & Q_{1y}^2 \\ \vdots & \vdots \\ Q_{1x}^{3N} & Q_{1y}^{3N} \\ Q_{1x}^{3N+1} & Q_{1y}^{3N+1} \end{pmatrix} \begin{pmatrix} Q_{2x}^1 & Q_{2y}^1 \\ Q_{2x}^2 & Q_{2y}^2 \\ \vdots & \vdots \\ Q_{2x}^{3N} & Q_{2y}^{3N} \\ Q_{2x}^{3N+1} & Q_{2y}^{3N+1} \end{pmatrix}$$

A transformation matrix M is identified between the coordinate matrix 208 representing the object corresponding to the first object selection 106 and the coordinate matrix of each similar shape. In the example illustrated by FIG. 2, there is one coordinate matrix 208 for the first object, one coordinate matrix 210 for the first similar object, one coordinate matrix 212 for the second similar object, and two transformation matrices 214 and 216 (one for each of coordinate matrix 210 and coordinate matrix 212). Each transformation matrix can be computed by $Q_i = M_i * P_i$. By performing this computation, the object identification engine 112 can generate a transformation matrix M for each of the similar shapes. An example of a transformation matrix M can be represented by:

$$\begin{pmatrix} a & b & t_x \\ c & d & t_y \\ 0 & 0 & 1 \end{pmatrix} = \begin{pmatrix} s_x\cos\psi & -s_x\sin\psi & t_x \\ s_y\sin\psi & s_y\cos\psi & t_y \\ 0 & 0 & 1 \end{pmatrix}$$

The object identification engine 112 provides each transformation matrix to the symmetric filter 114 for differentiating between similar objects that are not symmetric and similar objects that are symmetric to the first object. In some embodiments, the transformation matrix M can be decomposed into multiple component matrices that each represent specific transforms such as a translation matrix T, a rotation matrix R, and a scaling matrix S represented below. The object identification engine 112 can provide each of the component matrices or the transformation matrix to the symmetric filter 114.

$$T = \begin{pmatrix} 1 & 0 & t_x \\ 0 & 1 & t_y \\ 0 & 0 & 1 \end{pmatrix}; R = \begin{pmatrix} \cos\psi & -\sin\psi & 0 \\ \sin\psi & \cos\psi & 0 \\ 0 & 0 & 1 \end{pmatrix}; \text{and } S = \begin{pmatrix} s_x & 0 & 0 \\ 0 & s_y & 0 \\ 0 & 0 & 1 \end{pmatrix}.$$

Figure 3:
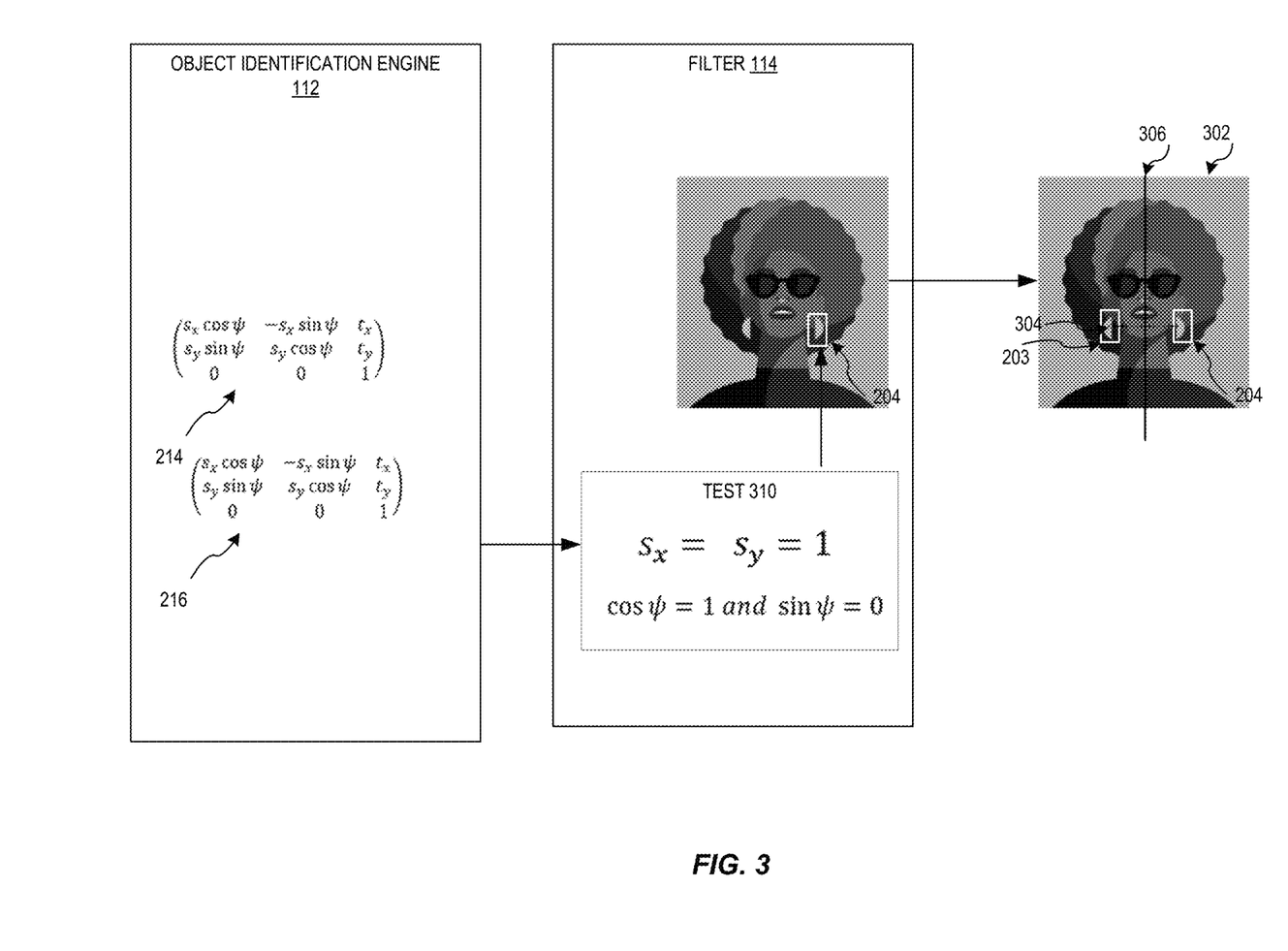
FIG. 3 depicts an example of filtering similar objects for symmetry to a selected object within an image.

FIG. 3 depicts an example of filtering similar objects for symmetry to a selected object within an image in accordance with one or more embodiments. The symmetric filter 114 receives the transformation matrix 214 of the object 203 corresponding to the first object selection 106 and the transformation matrix 216 of the object 203 as computed above. In the example illustrated by FIG. 3, the symmetric filter 114 selects the second similar object 204 as having a symmetric relationship with the object 203.

To determine symmetry, the symmetric filter 114 tests values of each of transformation matrix 214 and transformation matrix 216 that represent the affine transformations between the coordinate matrix of each similar object and the coordinate matrix of the object 203 indicated by the first object selection 106. The symmetric filter 114 differentiates between similar objects without symmetry and similar objects with symmetry to the selected object. The symmetric filter 114 applies a test 310 for $s_x=s_y=1$ to remove objects that have different scaling factors. The test 310 also filters for cos $\psi=1$ and sin $\psi=0$ to remove objects (e.g., object 203) that have the identical orientation as the object corresponding to the first object selection 106. The result of applying the symmetric filter 114 is the selection of the second similar object 204 as having symmetry with the selected object indicated by the first object selection 106.

In some embodiments, the object identification engine 112 selects multiple similar objects and the symmetric filter 114 determines that more than one similar object has symmetry to the object 203. The symmetric filter 114 is configurable to select one of the similar objects having symmetry using the distance between the object corresponding to the object 203 and each similar object having symmetry. For example, the similar object having symmetry that is closest to the object 203 corresponding to the first object selection 106 may be selected.

As described above with regard to numeral 5, the symmetric editor 118 generates the output symmetric object pair to a presentation device or client device. In some embodiments, the output symmetric object pair that includes the object corresponding to the first object selection 106 and the second similar object 204 in an output image 302 is annotated with a label for the axis of symmetry or objects for display by the presentation device or client device. For example, after the symmetric filter 114 selects the similar object having symmetry with the object corresponding to the first object selection 106 (i.e., second similar object 204), a first bounding box of the first object selection 106 and a second bounding box of the second similar object 204 are computed by the symmetric editor 118. An example of annotating the output image 302 includes generating a set of lines or points to display with the output image 302. The output image 302 is further annotated by adding a line 304 between the object corresponding to the first object selection 106 and the second similar object 204. A midpoint of the line 304 and an axis of symmetry 306 normal to the line 304 is computed. The axis of symmetry 306 also includes the midpoint of the line 304. Some or all of these computations can be annotated on the output image 302 (e.g., bounding box, line 304, midpoint, or axis of symmetry 306, etc.).

Figure 4:
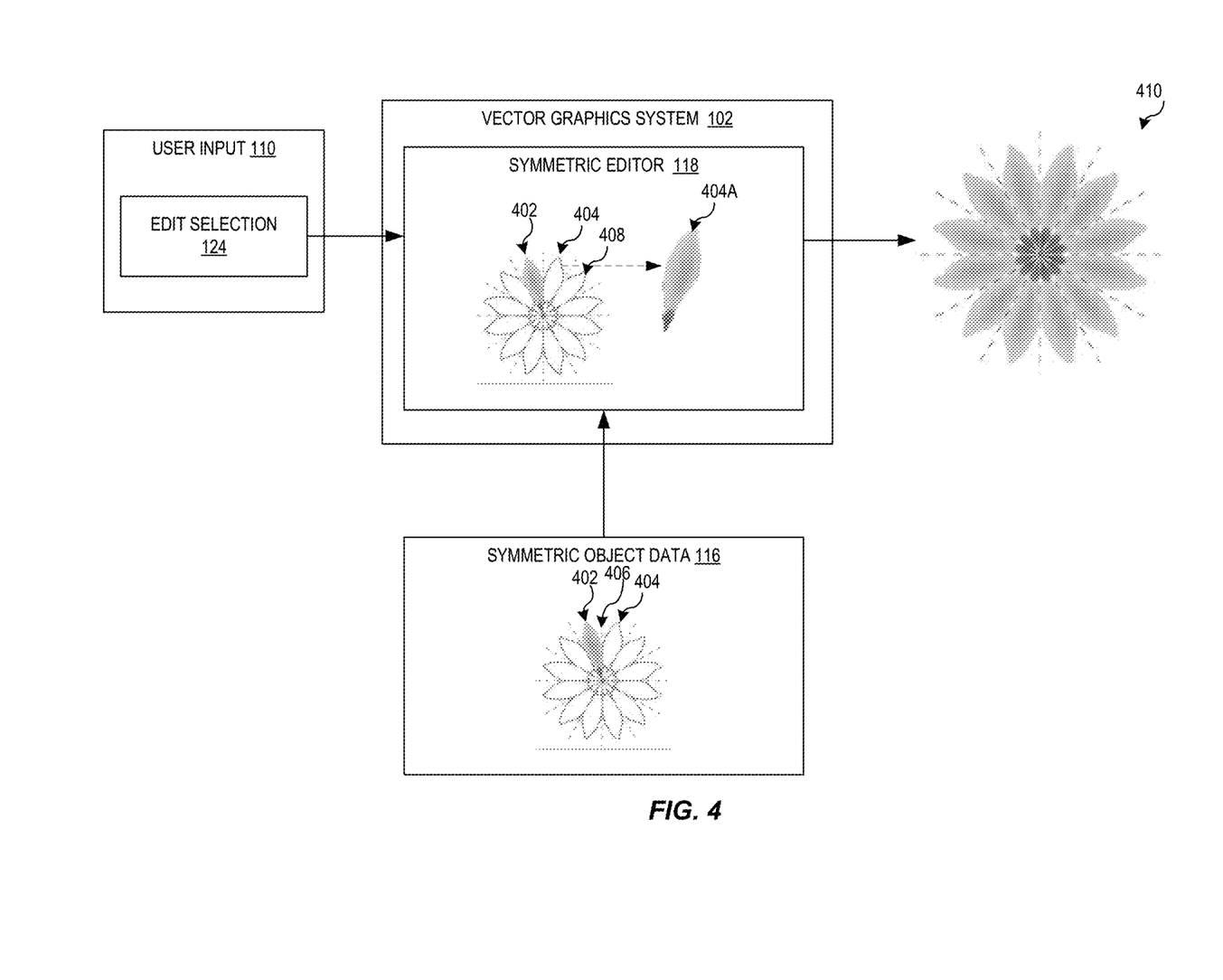
FIG. 4 illustrates performing a symmetric repeat edit in accordance with one or more embodiments.

FIG. 4 illustrates performing a symmetric repeat edit in accordance with one or more embodiments. For example, after the symmetric filter 114 selects a similar object that has symmetry with a selected object 402 (e.g., as indicated by a first object selection 106), the symmetric editor 118 processes the edit selection 124 in the user input 110. An example of an edit selection 124 can be a color change, a shape change, or any other graphical edit to the selected object 402. In the example illustrated by FIG. 4, the edit selection 124 corresponds to adding a gradient to the selected object 402.

In some embodiments, the symmetric editor 118 identifies the symmetric object pair including the selected object 402 and a symmetric object 404 in symmetric object data 116. As described above, the object identification engine previously identified that the symmetric object 404 has symmetry with the selected object 402. As described above, an axis of symmetry 406 is depicted between the selected object 402 and the symmetric object 404. The symmetric editor 118 applies a symmetric gradient to the symmetric object 404 as shown by the dashed line and the symmetric object 404 with the gradient applied to symmetric object 404A.

In some embodiments, the symmetric editor 118 can apply the edit selection 124 to other pairs of symmetric objects in symmetric object data 116. As illustrated by the example of FIG. 4, the symmetric object 404 is a member of another symmetric pair with additional symmetric object 408. The symmetric editor 118 can identify any number of symmetric pairs and perform additional symmetric repeat edits. In this example, the symmetric editor 118 performs iteratively to add gradients to all regions of the image with a symmetric pair have been edited. By performing the symmetric repeats using symmetric object pairs, the symmetric editor 118 provides a scalable solution for intricate images that include symmetric designs.

Figure 5:
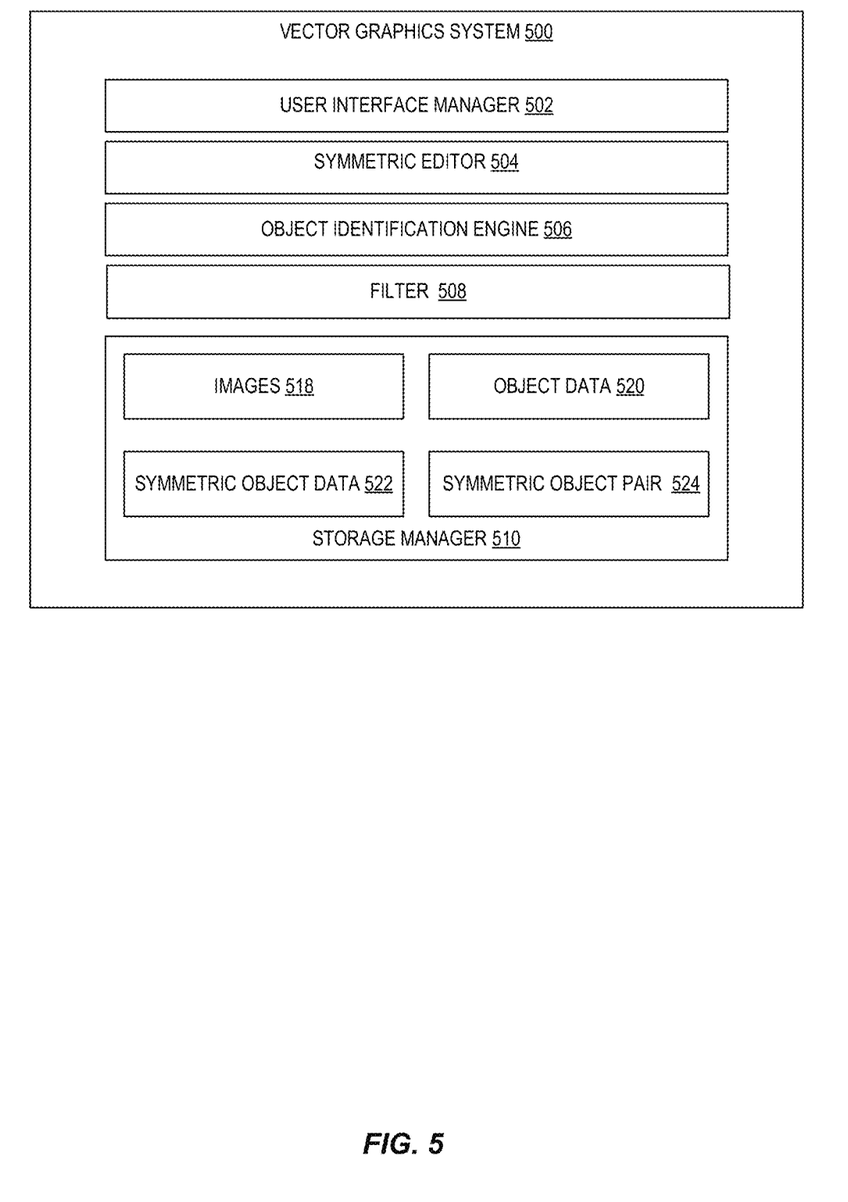
FIG. 5 illustrates a schematic diagram of a vector graphics system in accordance with one or more embodiments.

FIG. 5 illustrates a schematic diagram of a vector graphics system including a symmetric editor in accordance with one or more embodiments. As shown, the vector graphics system 500 may include but is not limited to user interface manager 502, symmetric editor 504, and storage manager 510. The symmetric editor 504 includes object identification engine 506 and filter 508. The storage manager 510 includes images 518, object data 520, symmetric object data 522, and symmetric object pair 524.

As illustrated in FIG. 5, the vector graphics system 500 includes a user interface manager 502. For example, the user interface manager 502 allows users to select images or objects for input to the vector graphics system 500. In some embodiments, the user interface manager 502 provides a user interface through which the user can upload the images 518 which include objects to be identified as having symmetry to a user selected object, such as the first object selection as discussed above. Alternatively, or additionally, the user interface manager 502 may enable the user to download the symmetric object pair 524 or object data 520 from a local or remote storage location (e.g., by providing an address (e.g., a URL or other endpoint) associated with images 518). In some embodiments, the user interface manager 502 can enable a user to link a library of images including multiple objects for asynchronous object identification by the vector graphics system (e.g., by object identification engine 506) that may have symmetric relationships and store the identified objects in object data 520.

Additionally, the user interface manager 502 allows users to request the vector graphics system 500 to identify symmetric objects for repeat editing in images 518. For example, the users can select an image and a first object to identify a similar object having symmetry with the first object. The user interface manager 502 allows the user to request edits to the first object and applies edits to the similar object. In some embodiments, the user interface manager 502 enables the user to view the resulting symmetric object pair 524 and/or request edits to the image 518 such as applying an edit of the first object to the similar object that has symmetry and updating the image 518 with the edits to both the first object and the similar object.

As illustrated in FIG. 5, the symmetric editor 504 includes an object identification engine 506. The object identification engine 506 can receive an image 518 and an object selection (e.g., first object selection 106) from the user interface manager 502 to identify multiple objects in the image 518 that are similar to the object selection. The object identification engine 506 performs a search of the image 518 or the object data 520 (e.g., for a previously processed image) to identify objects that have a similar shape to the object selection from the user interface manager 502. The object identification engine 112 searches the image for multiple candidate objects that have a similar shape to the first object. After identifying the candidate objects, the object identification engine 112 computes a transform matrix that represents a difference between the coordinate matrix of the selected object and the coordinate matrix of each candidate object.

As illustrated in FIG. 5, the symmetric editor 504 includes a filter 508. The filter 508 receives the transformation matrix for each of the candidate objects. The filter 508 determines if each candidate object has symmetry by testing values within the transformation matrix for each candidate object. For example, the filter 508 determines that candidate objects that have different scaling factors than the selected object do not have symmetry. The filter also determines that candidate objects that have the same orientation as the selected object do not have symmetry. After removing the candidate objects that do not have symmetry with the selected object, the filter 508 selects a candidate object from the candidate objects that do have symmetry.

As illustrated in FIG. 5, the vector graphics system 500 also includes the storage manager 510. The storage manager 510 maintains data for the vector graphics system 500. The storage manager 510 can maintain data of any type, size, or kind as necessary to perform the functions of the vector graphics system 500. The storage manager 510, as shown in FIG. 5, includes the images 518. The images 518 can include a plurality of images that each include objects which may have a symmetric relationship with another object in the image, as discussed in additional detail above. In particular, in one or more embodiments, the images 518 include a selected object (e.g., the first object selection) received from the user via the user interface manager 502 and one or more candidate objects.

As further illustrated in FIG. 5, the storage manager 510 also includes object data 520. Object data 520 can include information for any objects extracted from images 518 and utilized by the vector graphics system 500. For example, object data 520 includes coordinate matrices, perceptual parameters (e.g., hue, lightness, line thickness, etc.), and other information about objects in the images 518.

As further illustrated in FIG. 5, the storage manager 510 also includes symmetric object data 522. The symmetric object data 522 may include an indicator of a persistent relationship between a selected object and a symmetric object. For instance, the vector graphics system 500 can store metadata that links symmetric object pairs for subsequent processing while reducing additional detection of the same pair of symmetric objects.

As further illustrated in FIG. 5, the storage manager 510 also includes symmetric object pair 524. The symmetric object pair 524 may include a pair of objects including a selected object (e.g., the first object selection 106) and an object that has symmetry to the selected object and is from an image 518.

Each of the components 502-510 of the vector graphics system 500 and their corresponding elements (as shown in FIG. 5) may be in communication with one another using any suitable communication technologies. It will be recognized that although components 502-510 and their corresponding elements are shown to be separate in FIG. 5, any of components 502-510 and their corresponding elements may be combined into fewer components, such as into a single facility or module, divided into more components, or configured into different components that may serve a particular embodiment.

The components 502-510 and their corresponding elements can comprise software, hardware, or both. For example, the components 502-510 and their corresponding elements can comprise one or more instructions stored on a computer-readable storage medium and executable by processors of one or more computing devices. When executed by the one or more processors, the computer-executable instructions of the vector graphics system 500 can cause a client device and/or a server device to perform the methods described herein. Alternatively, the components 502-510 and their corresponding elements can comprise hardware, such as a special purpose processing device to perform a certain function or group of functions. Additionally, the components 502-510 and their corresponding elements can comprise a combination of computer-executable instructions and hardware.

Furthermore, the components 502-510 of the vector graphics system 500 may, for example, can be implemented as one or more stand-alone applications, as one or more modules of an application, as one or more plug-ins, as one or more library functions or functions that may be called by other applications, and/or as a cloud-computing model. Thus, the components 502-510 of the vector graphics system 500 may be implemented as a stand-alone application, such as a desktop or mobile application. Furthermore, the components 502-510 of the vector graphics system 500 may be implemented as one or more web-based applications hosted on a remote server. Alternatively, or additionally, the components of the vector graphics system 500 may be implemented in a suit of mobile device applications or "apps."

Figure 6:
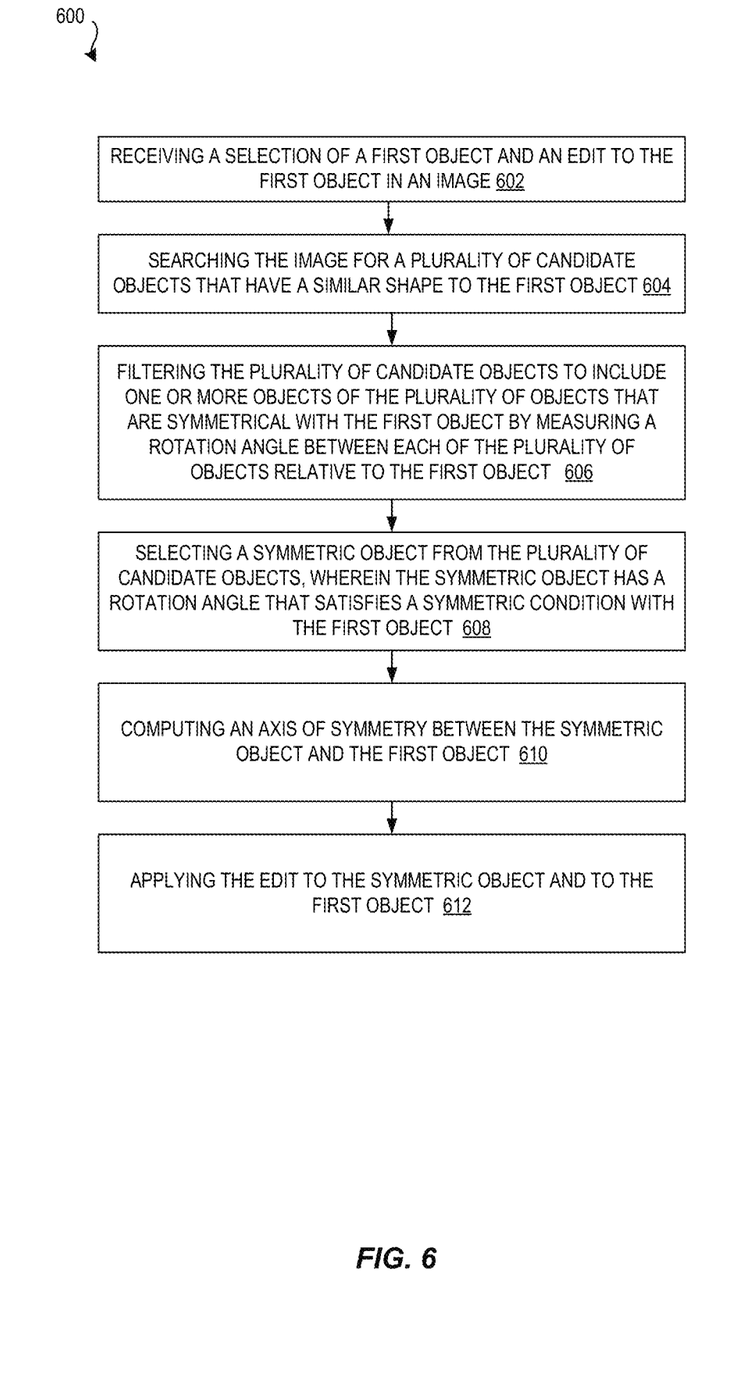
FIG. 6 illustrates a flowchart of a series of acts in a method of transform aware blend object generation in accordance with one or more embodiments.

FIGS. 1-5, the corresponding text, and the examples, provide a number of different systems and devices that allows a user to perform symmetric repeat edits. In addition to the foregoing, embodiments can also be described in terms of flowcharts comprising acts and steps in a method for accomplishing a particular result. For example, FIG. 6 illustrates a flowchart of an exemplary method in accordance with one or more embodiments. The method described in relation to FIG. 6 may be performed with fewer or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart 600 of a series of acts in a method of perform symmetric repeat edits in accordance with one or more embodiments. In one or more embodiments, the method 600 is performed in a digital medium environment that includes the vector graphics system 500. The method 600 is intended to be illustrative of one or more methods in accordance with the present disclosure and is not intended to limit potential embodiments. Alternative embodiments can include additional, fewer, or different steps than those articulated in FIG. 6.

As illustrated in FIG. 6, the method 600 includes an act 602 of receiving a selection of a first object and an edit to the first object in an image. As described above, the symmetric editor obtains an object selection, an image selection, and an edit selection as part of a user input. The object selection indicates an object within the image that is selected for identifying a symmetric object within the image and performing a symmetric to the selected object and the symmetric object. In some embodiments, a selection of a region within an image including the first object and one or more additional objects is received. Using the region within the image, the object identification engine may limit the detection of symmetric objects to the additional objects included in the region, such as by limiting the search performed at act 604.

As illustrated in FIG. 6, the method 600 includes an act 604 of searching the image for a plurality of candidate objects that have a similar shape to the first object. As described above, the object identification engine searches the image for candidate objects that have a similar shape to the first object. One of the candidate objects is determined to be similar to the first object when the candidate object can be obtained by computing a transformation matrix that represents a scaling, orientation, and position difference between each candidate object and the selected object (i.e., the first object).

As illustrated in FIG. 6, the method 600 includes an act 606 of filtering the plurality of candidate objects to include one or more objects of the plurality of objects that are symmetrical with the first object by measuring a rotation angle between each of the plurality of objects relative to the first object. As described above, the filter sorts the plurality of candidate objects that were determined to be similar (e.g., at act 604) to select similar objects that have symmetry. The filter selects one or more objects, which have symmetry with the first object, from the plurality of candidate objects. In some embodiments, the filter computes a transformation matrix for each of the candidate objects. The transformation matrix includes a translation factor, a scaling factor, and a rotation factor relative to the first object. The transformation matrix represents one or more linear transformations that, if applied to the candidate object, will result in the candidate object being the exact same as the first object. Using the transformation matrix, the filter determines that the symmetric object has a rotation factor that indicates symmetry with the first object.

In some embodiments, the filter may determine that multiple objects have symmetry with the first object. A symmetric object is selected from the multiple objects having symmetry by selecting the symmetric object that is disposed a minimum distance from the first object in comparison with the multiple objects having symmetry.

As illustrated in FIG. 6, the method 600 includes an act 608 of selecting a symmetric object from the plurality of candidate objects, wherein the symmetric object has a rotation angle that satisfies a symmetric condition with the first object. As described above, the filter selects the symmetric object that has a rotation angle (e.g., relative to the first object) of 0 degrees or 360 degrees.

As illustrated in FIG. 6, the method 600 includes an act 610 of computing an axis of symmetry between the symmetric object and the first object. As described above, the symmetric editor 118 computes a first bounding box of the first shape and a second bounding box of the symmetric shape. A line between the first object and the symmetric object with a midpoint of the line between the first object and the symmetric object is computed. The symmetric editor computes a normal line to the line where the normal line passes through the midpoint of the line. The normal line that passes through the midpoint is determined by the symmetric editor as the axis of symmetry.

As illustrated in FIG. 6, the method 600 includes an act 612 of applying the edit to the symmetric object and to the first object. As described above, the symmetric editor can apply an edit selection receive from a user to the symmetric object and the first object. The edit can be applied after selecting an object that has symmetry with the first object, by applying a color change, a shape change, or any other graphical edit to the first object and the symmetric object. During application of the edit, the symmetric editor applies the transformation matrix to the edit of the first object such that the edit to the symmetric object has pixel-wise symmetry.

Figure 7:
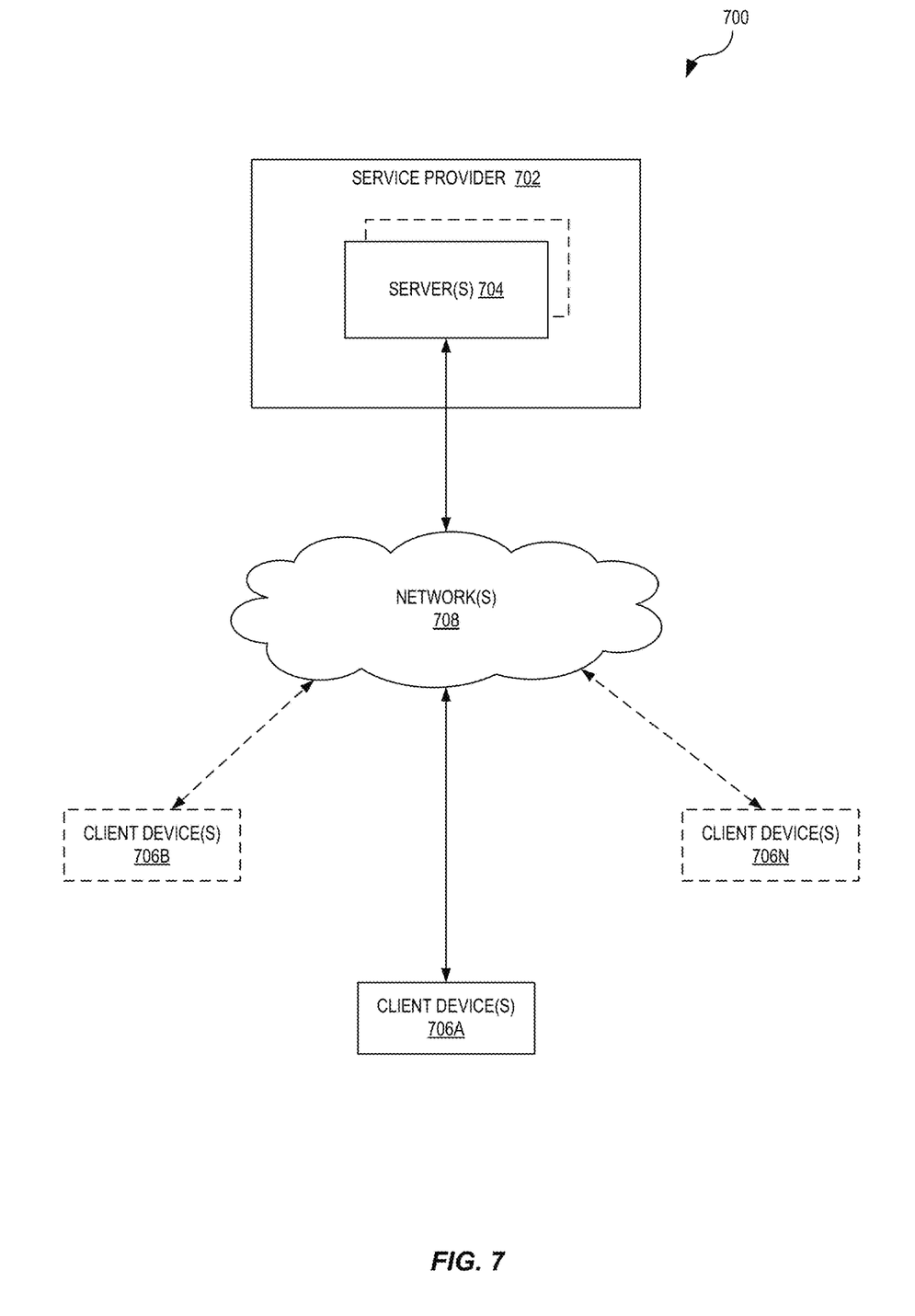
FIG. 7 illustrates a schematic diagram of an exemplary environment in which the vector graphics system can operate in accordance with one or more embodiments.

FIG. 7 illustrates a schematic diagram of an exemplary environment 700 in which the vector graphics system 500 can operate in accordance with one or more embodiments. In one or more embodiments, the environment 700 includes a service provider 702 which may include one or more servers 704 connected to a plurality of client devices 706A-706N via one or more networks 708. The client devices 706A-706N, the one or more networks 708, the service provider 702, and the one or more servers 704 may communicate with each other or other components using any communication platforms and technologies suitable for transporting data and/or communication signals, including any known communication technologies, devices, media, and protocols supportive of remote data communications, examples of which will be described in more detail below with respect to FIG. 8.

Although FIG. 7 illustrates a particular arrangement of the client devices 706A-706N, the one or more networks 708, the service provider 702, and the one or more servers 704, various additional arrangements are possible. For example, the client devices 706A-706N may directly communicate with the one or more servers 704, bypassing the network 708. Or alternatively, the client devices 706A-706N may directly communicate with each other. The service provider 702 may be a public cloud service provider which owns and operates their own infrastructure in one or more data centers and provides this infrastructure to customers and end users on demand to host applications on the one or more servers 704. The servers may include one or more hardware servers (e.g., hosts), each with its own computing resources (e.g., processors, memory, disk space, networking bandwidth, etc.) which may be securely divided between multiple customers, each of which may host their own applications on the one or more servers 704. In some embodiments, the service provider may be a private cloud provider which maintains cloud infrastructure for a single organization. The one or more servers 704 may similarly include one or more hardware servers, each with its own computing resources, which are divided among applications hosted by the one or more servers for use by members of the organization or their customers.

Similarly, although the environment 700 of FIG. 7 is depicted as having various components, the environment 700 may have additional or alternative components. For example, the environment 700 can be implemented on a single computing device with the vector graphics system 500. In particular, the vector graphics system 500 may be implemented in whole or in part on the client device 706A.

As illustrated in FIG. 7, the environment 700 may include client devices 706A-706N. The client devices 706A-706N may comprise any computing device. For example, client devices 706A-706N may comprise one or more personal computers, laptop computers, mobile devices, mobile phones, tablets, special purpose computers, TVs, or other computing devices, including computing devices described below with regard to FIG. 8. Although three client devices are shown in FIG. 7, it will be appreciated that client devices 706A-706N may comprise any number of client devices (greater or smaller than shown).

Moreover, as illustrated in FIG. 7, the client devices 706A-706N and the one or more servers 704 may communicate via one or more networks 708. The one or more networks 708 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 708 may be any suitable network over which the client devices 706A-706N may access service provider 702 and server 704, or vice versa. The one or more networks 708 will be discussed in more detail below with regard to FIG. 8.

In addition, the environment 700 may also include one or more servers 704. The one or more servers 704 may generate, store, receive, and transmit any type of data, including images 518, object data 520, symmetric object data 522, symmetric object pair 524, or other information. For example, a server 704 may receive data from a client device, such as the client device 706A, and send the data to another client device, such as the client device 702B and/or 702N. The server 704 can also transmit electronic messages between one or more users of the environment 700. In one example embodiment, the server 704 is a data server. The server 704 can also comprise a communication server or a web-hosting server. Additional details regarding the server 704 will be discussed below with respect to FIG. 8.

As mentioned, in one or more embodiments, the one or more servers 704 can include or implement at least a portion of the vector graphics system 500. In particular, the vector graphics system 500 can comprise an application running on the one or more servers 704 or a portion of the vector graphics system 500 can be downloaded from the one or more servers 704. For example, the vector graphics system 500 can include a web hosting application that allows the client devices 706A-706N to interact with content hosted at the one or more servers 704. To illustrate, in one or more embodiments of the environment 700, one or more client devices 706A-706N can access a webpage supported by the one or more servers 704. In particular, the client device 706A can run a web application (e.g., a web browser) to allow a user to access, view, and/or interact with a webpage or website hosted at the one or more servers 704.

Upon the client device 706A accessing a webpage or other web application hosted at the one or more servers 704, in one or more embodiments, the one or more servers 704 can provide access to images, symmetric object data, or output symmetric object pairs (e.g., images 518, symmetric object data 522, etc.) stored at the one or more servers 704. Moreover, the client device 706A can receive a request (i.e., via user input) to perform a symmetric repeat edit of a symmetric object pair and provide the request to the one or more servers 704. Upon receiving the request, the one or more servers 704 can automatically perform the methods and processes described above to generate the output symmetric object pairs. The one or more servers 704 can provide all or portions of the output object sequence, to the client device 706A for display to the user.

As just described, the vector graphics system 500 may be implemented in whole, or in part, by the individual elements 702-708 of the environment 700. It will be appreciated that although certain components of the vector graphics system 500 are described in the previous examples with regard to particular elements of the environment 700, various alternative implementations are possible. For instance, in one or more embodiments, the vector graphics system 500 is implemented on any of the client devices 706A-706N. Similarly, in one or more embodiments, the vector graphics system 500 may be implemented on the one or more servers 704. Moreover, different components and functions of the vector graphics system 500 may be implemented separately among client devices 706A-706N, the one or more servers 704, and the network 708.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, that both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
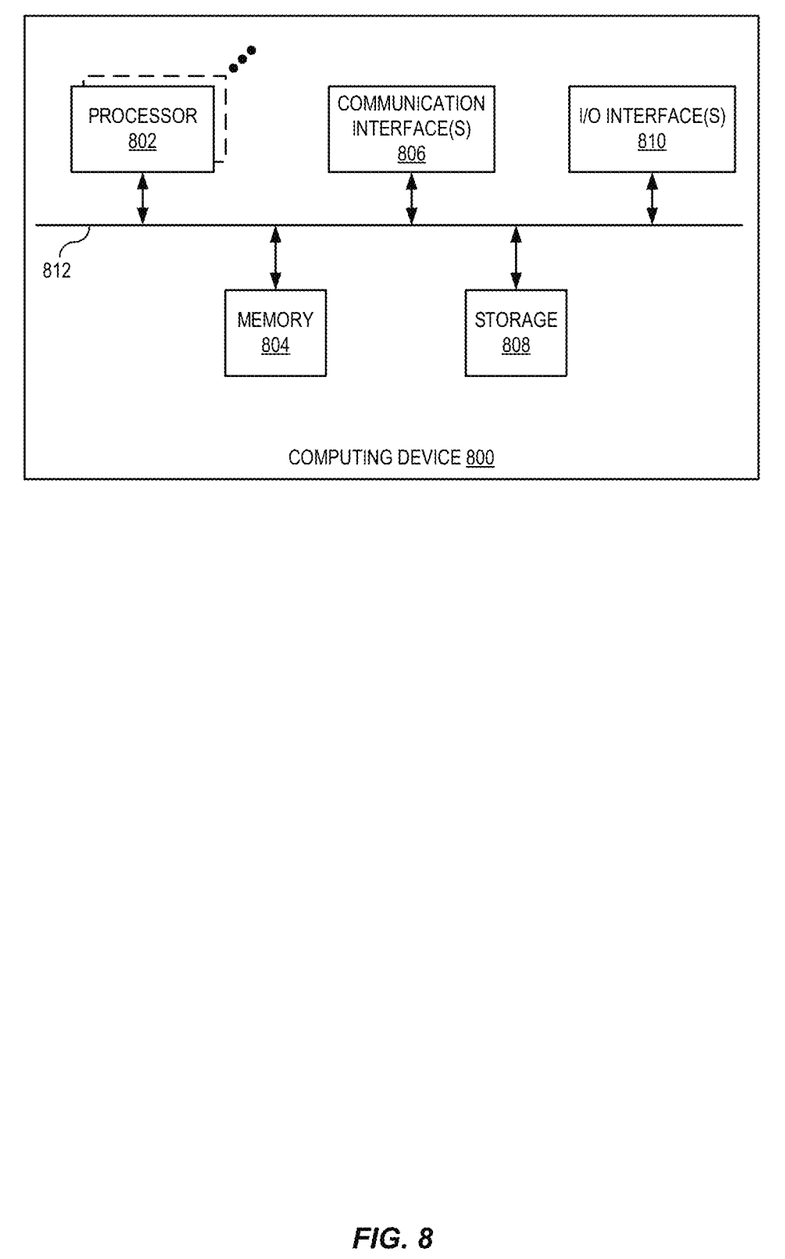
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the vector graphics system 500. As shown by FIG. 8, the computing device can comprise a processor 802, memory 804, one or more communication interfaces 806, a storage device 808, and one or more I/O devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example, and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 which includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination of these or other storage devices. The computing device 800 also includes one or more input or output ("I/O") devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving a selection of a first object and an edit to the first object in an image;
   searching the image for a plurality of candidate objects that have a similar shape to the first object;
   filtering the plurality of candidate objects to include one or more objects of the plurality of candidate objects that are symmetrical with the first object by measuring a rotation angle between each of the plurality of candidate objects relative to the first object;
   selecting a symmetric object from the plurality of candidate objects, wherein the symmetric object has a rotation angle that satisfies a symmetric condition with the first object;
   computing an axis of symmetry between the symmetric object and the first object; and
   applying the edit to the symmetric object and to the first object.

2. The method of claim 1, wherein filtering the plurality of candidate objects comprises:
   computing, for each candidate object of the plurality of candidate objects, a transformation matrix comprising a translation factor, a scaling factor, and a rotation factor relative to the first object; and
   determining that the symmetric object has a rotation factor that indicates symmetry with the first object.

3. The method of claim 1 wherein computing an axis of symmetry between the symmetric object and the first object comprises:
   computing a first bounding box of the first object and a second bounding box of the symmetric object;
   generating a line between the first object and the symmetric object;
   computing a midpoint of the line between the first object and the symmetric object; and
   determining the axis of symmetry that is normal to the line and includes the midpoint of the line.

4. The method of claim 1 further comprising storing a relationship between the first object and the symmetric object in metadata of the image.

5. The method of claim 1 further comprising terminating a relationship between the first object and the symmetric object in metadata of the image.

6. The method of claim 1 wherein filtering the plurality of candidate objects comprises selecting a candidate object that has a same shape of the first object and has a minimum distance between the selected candidate object and the first object.

7. The method of claim 1 wherein receiving a selection of a first object comprises:
   receiving a selection of a region including the first object and one or more additional objects; and
   limiting the searching of the image for symmetric objects to the additional objects included in the region.

8. A non-transitory computer-readable medium storing executable instructions, which when executed by a processing device, causes the processing device to perform operations comprising:
   receiving a selection of a first object and an edit to the first object in an image;
   searching the image for a plurality of candidate objects that have a similar shape to the first object;

filtering the plurality of candidate objects to include one or more objects of the plurality of candidate objects that are symmetrical with the first object by measuring a rotation angle between each of the plurality of candidate objects relative to the first object;

selecting a symmetric object from the plurality of candidate objects, wherein the symmetric object has a rotation angle that satisfies a symmetric condition with the first object;

computing an axis of symmetry between the symmetric object and the first object; and applying the edit to the symmetric object and to the first object.

9. The non-transitory computer-readable medium of claim 8, wherein the instructions for filtering the plurality of candidate objects comprise instructions which, when executed by the processing device further cause the processing device to perform operations comprising:

computing, for each candidate object of the plurality of candidate objects, a transformation matrix comprising a translation factor, a scaling factor, and a rotation factor relative to the first object; and determining that the symmetric object has a rotation factor that indicates symmetry with the first object.

10. The non-transitory computer-readable medium of claim 8, wherein the instructions for computing an axis of symmetry between the symmetric object and the first object comprise instructions which, when executed by the processing device further cause the processing device to perform operations comprising:

computing a first bounding box of the first object and a second bounding box of the symmetric object;

generating a line between the first object and the symmetric object;

computing a midpoint of the line between the first object and the symmetric object; and determining the axis of symmetry that is normal to the line and includes the midpoint of the line.

11. The non-transitory computer-readable medium of claim 8, the instructions further causing the processing device to perform operations comprising storing a relationship between the first object and the symmetric object in metadata of the image.

12. The non-transitory computer-readable medium of claim 8, the instructions further causing the processing device to perform operations comprising terminating a relationship between the first object and the symmetric object in metadata of the image.

13. The non-transitory computer-readable medium of claim 8, wherein the instructions for filtering the plurality of candidate objects comprise instructions which, when executed by the processing device further cause the processing device to perform operations comprising selecting a candidate object that has a same shape of the first object and has a minimum distance between the selected candidate object and the first object.

14. The non-transitory computer-readable medium of claim 8, wherein the instructions for receiving a selection of a first object comprise instructions which, when executed by the processing device further cause the processing device to perform operations comprising:

receiving a selection of a region including the first object and one or more additional objects; and limiting the searching of the image for symmetric objects to the additional objects included in the region.

15. A system comprising:

a memory component; and a processing device coupled to the memory component, the processing device to perform operations comprising:

receiving a selection of a first object and an edit to the first object in an image; and identifying a symmetric object to the first object, the identifying comprising:

computing one or more linear transformations between the symmetric object and the first object, wherein the one or more linear transformations include a rotation, a scaling, and a translation;

determining that the rotation indicates that the symmetric object has symmetry with the first object;

determining that the scaling and the translation indicate the symmetric object is an identical size and shape to the first object;

applying the edit to the first object and the symmetric object; and outputting the edited first object and the edited symmetric object.

16. The system of claim 15, wherein the operation of receiving a selection of a first object and an edit to the first object in an image comprises:

receiving a selection of a region including the first object and one or more additional objects; and limiting a position of the symmetric object to the region.

17. The system of claim 15, wherein the operation of applying the edit to the first object and the symmetric object comprises causing the processing device to perform operations comprising:

computing a first bounding box of the first object and a second bounding box of the symmetric object;

generating a line between the first object and the symmetric object;

computing a midpoint of the line between the first object and the symmetric object; a determining an axis of symmetry that is normal to the line and includes the midpoint of the line; and applying the edit to the symmetric object using the axis of symmetry to adjust each pixel of the symmetric object.

18. The system of claim 15, the operations further comprising storing a relationship between the first object and the symmetric object in metadata of the image.

19. The system of claim 15, wherein the one or more linear transformations are represented by a transformation matrix for the symmetric object including a translation factor, a scaling factor, and a rotation factor relative to the first object.

20. The system of claim 19, the operations further comprising:

testing one or more values of the transformation matrix to determine that the symmetric object has a different orientation than the first object.

* * * * *